(12) United States Patent
Tyler et al.

(10) Patent No.: US 9,537,185 B2
(45) Date of Patent: Jan. 3, 2017

(54) WELDING TECHNIQUES FOR POLYMERIZED LITHIUM ION BATTERY CELLS AND MODULES

(71) Applicant: Johnson Controls Technology Company, Holland, MI (US)

(72) Inventors: Matthew R. Tyler, Brown Deer, WI (US); Kem M. Obasih, Brookfield, WI (US)

(73) Assignee: Johnson Controls Technology Company, Holland, MI (US)

(*) Notice: Subject to any disclaimer, the term of this patent is extended or adjusted under 35 U.S.C. 154(b) by 201 days.

(21) Appl. No.: 14/142,058

(22) Filed: Dec. 27, 2013

(65) Prior Publication Data

US 2014/0186683 A1     Jul. 3, 2014

Related U.S. Application Data

(60) Provisional application No. 61/746,836, filed on Dec. 28, 2012.

(51) Int. Cl.
*H01M 10/058*     (2010.01)
*H01M 10/647*     (2014.01)
(Continued)

(52) U.S. Cl.
CPC .......... *H01M 10/5032* (2013.01); *B29C 65/00* (2013.01); *H01M 2/0217* (2013.01);
(Continued)

(58) Field of Classification Search
None
See application file for complete search history.

(56) References Cited

U.S. PATENT DOCUMENTS 3,560,283 A     2/1971    Gomis et al.
3,947,307 A *   3/1976    Buchscheidt ........... B29C 65/08
                                                                     156/580.2
(Continued)

FOREIGN PATENT DOCUMENTS

EP     0823739 A2     2/1998
EP     1278263 A2     1/2003
(Continued)

OTHER PUBLICATIONS

International Search Report and Written Opinion for PCT Application No. PCT/US2013/078053 dated Mar. 24, 2014; 8 pgs.
(Continued)

*Primary Examiner* — Patrick Ryan
*Assistant Examiner* — Wyatt McConnell
(74) *Attorney, Agent, or Firm* — Fletcher Yoder, P.C.

(57) ABSTRACT

A lithium ion (Li-ion) battery cell includes a housing. The housing includes side walls coupled to and extending from a first portion of the housing to form an opening in the housing opposite the first portion of the housing. The housing includes an electrically nonconductive polymeric (e.g., plastic) material. An electrochemical cell element is disposed in the housing and immersed in electrolyte that is also disposed in the housing. The Li-ion battery cell also includes a cover including an electrically nonconductive polymeric material. The cover is disposed over the opening in the housing and sealed to the housing via a seal. The seal is configured to resist or prevent ingress of moisture into the housing and to resist or prevent egress of the electrolyte from the housing.

4 Claims, 9 Drawing Sheets

(51) Int. Cl.
*H01M 2/02* (2006.01)
*H01M 2/10* (2006.01)
*H01M 2/04* (2006.01)
*H01M 10/04* (2006.01)
*H01M 10/625* (2014.01)
*H01M 10/6551* (2014.01)
*H01M 10/6554* (2014.01)
*H01M 10/655* (2014.01)
*H01M 10/613* (2014.01)
*B29L 31/00* (2006.01)
*B29C 65/08* (2006.01)
*B29C 65/16* (2006.01)
*B29C 65/00* (2006.01)

(52) U.S. Cl.
CPC ....... *H01M 2/0242* (2013.01); *H01M 2/0247* (2013.01); *H01M 2/0262* (2013.01); *H01M 2/0277* (2013.01); *H01M 2/0282* (2013.01); *H01M 2/0287* (2013.01); *H01M 2/0295* (2013.01); *H01M 2/0439* (2013.01); *H01M 2/0482* (2013.01); *H01M 2/1072* (2013.01); *H01M 2/1077* (2013.01); *H01M 10/0413* (2013.01); *H01M 10/0431* (2013.01); *H01M 10/613* (2015.04); *H01M 10/625* (2015.04); *H01M 10/647* (2015.04); *H01M 10/655* (2015.04); *H01M 10/6551* (2015.04); *H01M 10/6554* (2015.04); *B29C 65/08* (2013.01); *B29C 65/1635* (2013.01); *B29C 66/1222* (2013.01); *B29C 66/1224* (2013.01); *B29C 66/54* (2013.01); *B29L 2031/7146* (2013.01); *H01M 2/022* (2013.01); *H01M 2/0285* (2013.01); *Y10T 29/4911* (2015.01); *Y10T 29/49108* (2015.01); *Y10T 29/49115* (2015.01)

(56) References Cited

U.S. PATENT DOCUMENTS

| | | | | |
|---|---|---|---|---|
| 4,997,142 A | * | 3/1991 | Grant | B65H 75/14 156/309.6 |
| 6,458,278 B1 | * | 10/2002 | Leoncavallo | B01D 29/05 210/321.75 |
| 8,691,425 B2 | | 4/2014 | Yoon | |
| 2003/0017384 A1 | | 1/2003 | Marukawa et al. | |
| 2004/0101748 A1 | | 5/2004 | Puttaiah et al. | |
| 2005/0233206 A1 | * | 10/2005 | Puttaiah | H01M 2/024 429/120 |
| 2007/0037053 A1 | | 2/2007 | Anantharaman | |
| 2007/0278097 A1 | * | 12/2007 | Bhullar | B23K 26/24 204/403.01 |
| 2008/0205880 A1 | * | 8/2008 | Aoshima | B29C 65/1635 396/510 |
| 2009/0085518 A1 | * | 4/2009 | Hong | H01M 2/0215 320/134 |
| 2011/0270356 A1 | * | 11/2011 | McKenzie | A61N 1/375 607/57 |
| 2012/0021268 A1 | | 1/2012 | Mailley et al. | |
| 2012/0125447 A1 | | 5/2012 | Fuhr et al. | |
| 2012/0263988 A1 | | 10/2012 | Obasih et al. | |

FOREIGN PATENT DOCUMENTS

| | | |
|---|---|---|
| EP | 2500958 A1 | 9/2012 |
| GB | 719027 | 11/1954 |
| JP | S62262364 A | 11/1987 |
| WO | 03/038929 A2 | 5/2003 |
| WO | WO2010/135456 * | 11/2010 |

OTHER PUBLICATIONS

International Search Report and Written Opinion for PCT Application No. PCT/US22013/078080 dated Mar. 24, 2014; 8 pgs.
International Search Report and Written Opinion for PCT Application No. PCT/US22013/078090 dated Mar. 24, 2014; 8 pgs.
International Search Report and Written Opinion for PCT Application No. PCT/US2013/078068 dated Mar. 28 2014; 8 pgs.
CN 201380073773.6 Office Action dated Sep. 27, 2016.
CN 2013870073781.0 Office Action dated Sep. 30, 2016.

* cited by examiner

WELDING TECHNIQUES FOR POLYMERIZED LITHIUM ION BATTERY CELLS AND MODULES

CROSS REFERENCE TO RELATED APPLICATIONS

This application claims priority from and the benefit of U.S. Provisional Application Ser. No. 61/746,836, entitled "VARIOUS EMBODIMENTS OF PLASTIC OR POLYMERIZED BATTERY MODULES", filed Dec. 28, 2012, which is hereby incorporated by reference for all purposes. This application relates to, and is hereby filed concurrently with, U.S. patent application Ser. No. 14/142,051, entitled "POLYMERIZD LITHIUM ION BATTERY CELLS AND MODULES WITH OVERMOLDED HEAT SINKS", with inventors Kem Obasih and Matt Tyler, U.S. patent application Ser. No. 14/142,055, entitled "POLYMERIZED LITHIUM ION BATTERY CELLS AND MODULES WITH PERMEABILITY MANAGEMENT FEATURES", with inventors Matt Tyler and Kem Obasih, and and U.S. patent application Ser. No. 14/142,058, entitled "POLYMERIZED LITHIUM ION BATTERY CELLS AND MODULES WITH THERMAL MANAGEMENT FEATURES", with inventors Kem Obasih and Matt Tyler, all of which are hereby incorporated by reference for all purposes.

BACKGROUND

The disclosure relates generally to the field of batteries and battery modules. More specifically, the present disclosure relates to polymerized (e.g., plastic) lithium ion batteries and battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and typically operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and may recover braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

Vehicles using electric power for all or a portion of their motive power may provide numerous advantages as compared to traditional vehicles powered by internal combustion engines. For example, vehicles using electric power may produce fewer pollutants and may exhibit greater fuel efficiency. In some cases, vehicles using electric power may eliminate the use of gasoline entirely and derive the entirety of their motive force from electric power. As technology continues to evolve, there is a need to provide improved power sources, particularly battery modules, for such vehicles.

Vehicles using electric power for at least a portion of their motive force may derive their electric power from multiple individual battery cells, which may be packaged into battery modules. In particular, multiple lithium ion battery cells or cell elements may be packaged into battery modules. Lithium ion battery cells or cell elements and their associated battery module(s) may operate at elevated temperatures (e.g., between 0 and 85° C.) compared to traditional lead acid batteries, so they are typically packaged in a material that facilitates cooling. Also, lithium ion cell elements are particularly susceptible to oxygen or moisture, so they are typically packaged in a hermetically sealed metal housing. However, due to the limitations of metal fabrication, form factors are similarly limited. Accordingly, there is a need for addressing thermal management and permeability concerns described above in a cost effective manner that enables efficient production methods and techniques.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Present embodiments of the disclosure are related to a lithium ion (Li-ion) battery cell that includes a housing. The housing includes side walls coupled to and extending from a first portion of the housing to form an opening in the housing opposite the first portion of the housing. The housing includes an electrically nonconductive polymeric material. An electrochemical element is disposed in the housing and immersed in electrolyte that is also disposed in the housing. The Li-ion battery cell also includes a cover including an electrically nonconductive polymeric material. The cover is disposed over the opening in the housing and sealed to the housing via a seal. The seal is configured to resist or prevent ingress of moisture into the housing and to resist or prevent egress of the electrolyte from the housing.

Embodiments of the disclosure are also directed to a lithium ion (Li-ion) battery module that includes a container. The container includes side walls that define an outer perimeter of the container. The container also includes one or more partitions that define compartments within the container. The side walls and the partitions are coupled to and extend from a first portion of the container to form openings in the container opposite the first portion. Additionally, the container includes an electrically nonconductive polymeric material. Li-ion electrochemical elements are disposed one in each of the compartments in the container, along with electrolyte. A cover including an electrically nonconductive polymeric material is disposed over all of the openings in the container and sealed to the container via welds formed between the container and the cover along the partitions and the side walls. The welds are configured to resist or prevent ingress of moisture into the compartments and to resist or prevent egress of the electrolyte from the compartments.

Embodiments of the disclosure are also directed to a method for manufacturing a lithium ion (Li-ion) battery cell. The method includes disposing a Li-ion electrochemical element into a housing through an opening in the housing. The housing includes side walls coupled to and extending from a first portion of the housing to form the opening in the housing. Additionally, the housing includes an electrically nonconductive polymeric material. The method also includes disposing a cover over the opening in the housing. The cover includes an electrically nonconductive polymeric material. The method also includes sealing the cover to the housing via a weld. The weld is configured to resist or prevent ingress of moisture into the housing and to resist or prevent egress of electrolyte from the housing.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The battery systems described herein may be used to provide power to various types of electric vehicles and other high voltage energy storage/expending applications (e.g., electrical grid power storage systems). Such battery systems may include one or more battery modules, each battery module having a number of battery cells (e.g., lithium ion (herein "Li-ion") electrochemical cells) containing cell elements arranged to provide particular voltages and/or currents useful to power, for example, one or more components of an xEV. In accordance with the present disclosure, polymeric (e.g., plastic) materials may be used for a portion of each battery module (e.g., a container formed by the battery module) and/or a portion of each Li-ion electrochemical cell (e.g., a housing of the Li-ion electrochemical cell surrounding the cell element). By using polymeric housings and/or containers, production cost is reduced compared to traditional Li-ion battery modules that include expensive and harder to form metal materials. Plastic housings and containers enable lower piece price, lower tooling costs, shorter lead times, reduced part quantities, and greater processing flexibility and efficiency. For example, a traditional metal housing for a cell element may include a non-conducting sleeve around the metal housing to prevent electrical shorts. Processing the traditional metal housing and sleeve separately may lengthen the manufacturing process and increase the number of parts for the battery module, both of which may increase production cost. Using polymeric materials for the housing may reduce production cost and time. Additionally, polymeric materials enable injection molding around non-polymeric materials, such as to address thermal control issues. Certain polymeric formulations and/or coatings may be used to address permeability issues and/or thermal conductivity.

With the foregoing in mind, the Li-ion electrochemical cells (or cell elements) of each battery module may generate heat, which may cause the battery modules to operate at an elevated temperature. For example, battery modules of the present disclosure may operate at temperatures up to 85° Celsius. Traditional molded polymers may be poor thermal conductors. Additionally, traditional molded polymers may be susceptible to water, oxygen, hydrocarbon/organic carbonate, and/or electrolyte migration or permeability that may negatively affect the Li-ion electrochemical cells. Accordingly, there is a need for improved thermal management and permeability management of battery systems with polymer based housings and/or battery modules (e.g., containers), in order to produce the battery modules at reduced costs and with greater efficiency.

Presently disclosed embodiments are directed to polymer (e.g., plastic) battery systems that include various features to promote thermal management and impermeability of the polymer battery components. In some embodiments, each Li-ion electrochemical cell may include features that address thermal management and permeability management concerns. In other embodiments, the battery module and its associated elements (e.g., the container formed by the battery module) may include features that address thermal management and permeability management concerns. In still other embodiments, each Li-ion electrochemical cell and the battery module may both include features that address thermal management and permeability management concerns. In accordance with the present disclosure, thermal management and/or permeability management concerns may be addressed at the cell and/or module level by using polymeric cell housings and/or module containers with nanomaterial additives, using thermally enhanced polymeric composite housings and/or containers, metalizing the outside and/or inside of housings and/or containers (e.g., metalizing with aluminum), and/or using polymeric housings and/or containers with molded-in heat sink plates. Nanomaterial additives, metalized surfaces, and molded in heat sinks enable sufficient thermal management and permeability management that may arise from concerns associated with using plastic materials. Additionally, in accordance with the present disclosure, laser welding and/or ultrasonic welding techniques may be adapted to enhance and enable impermeability of cells and battery modules that include a polymer (e.g., plastic) base material with additives, nanosupplements, and/or metalized layers.

Figure 1:
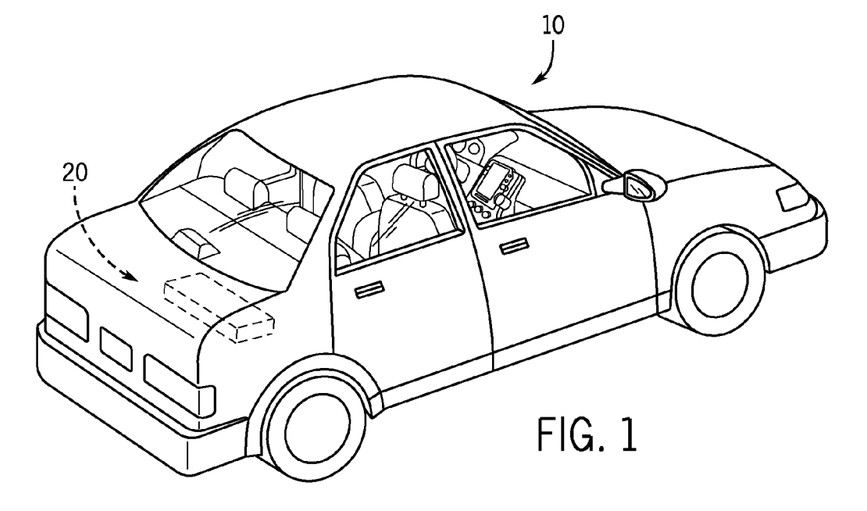
FIG. 1 is a perspective view of an embodiment of a vehicle having a battery module to provide power for various components of the vehicle, in accordance with the present techniques.

With the foregoing in mind, FIG. 1 is a perspective view of an xEV 10 in the form of an automobile (e.g., a car) having a battery system (e.g., a Li-ion battery system 12) in accordance with present embodiments for providing a portion of the motive power for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the Li-ion battery system 12 to power at least one or more accessories (e.g., AC, lights, consoles, etc.), as well as the ignition of the internal combustion engine, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 12 is illustrated in FIG. 1 as being positioned in the trunk or rear of the vehicle, according to other embodiments, the location of the battery system 12 may differ. For example, the position of the battery system 12 may be selected based on the available space within a vehicle, the desired weight balance of the vehicle, the location of other components used with the battery system 12 (e.g., battery control units, measurement electronics, etc.), and a variety of other considerations.

Figure 2:
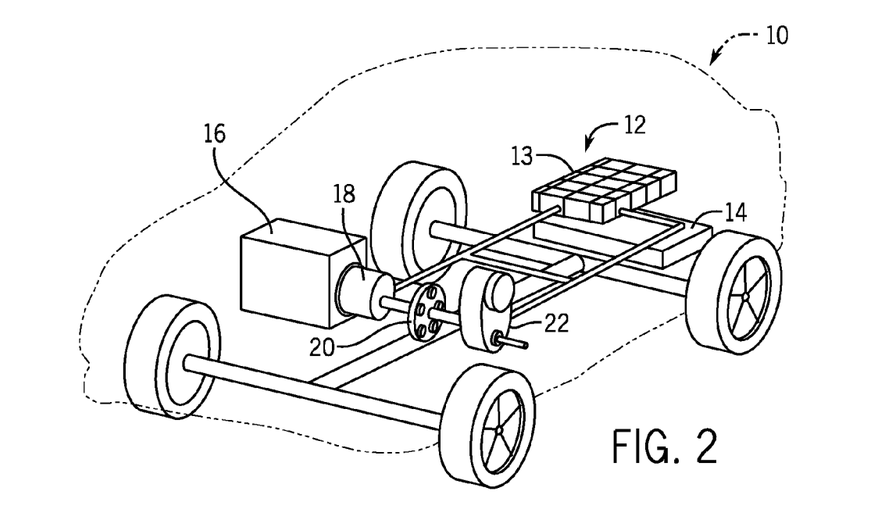
FIG. 2 is a cutaway schematic view of an embodiment of the vehicle and the battery module of FIG. 1, in accordance with the present techniques.

In some embodiments, the xEV 10 may be an HEV having the battery system 12, which includes one or more battery modules 13, as illustrated in FIG. 2. In particular, the battery system 12 illustrated in FIG. 2 is disposed toward the rear of the vehicle 10 proximate a fuel tank 14. In other embodiments, the battery system 12 may be provided immediately adjacent the fuel tank 14, provided in a separate compartment in the rear of the vehicle 10 (e.g., a trunk), or provided in another suitable location in the HEV 10. Further, as illustrated in FIG. 2, the HEV 10 includes an internal combustion engine 16 for times when the HEV 10 utilizes gasoline power to propel the vehicle 10. The HEV 10 also includes an electric motor 18, a power split device 20, and a generator 22 as part of the drive system.

The HEV 10 illustrated in FIG. 2 may be powered or driven by the battery system 12 alone, by the combustion engine 16 alone, or by both the battery system 12 and the combustion engine 16. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 12 and the type of vehicle, among other features, may differ from those shown or described.

Figure 3:
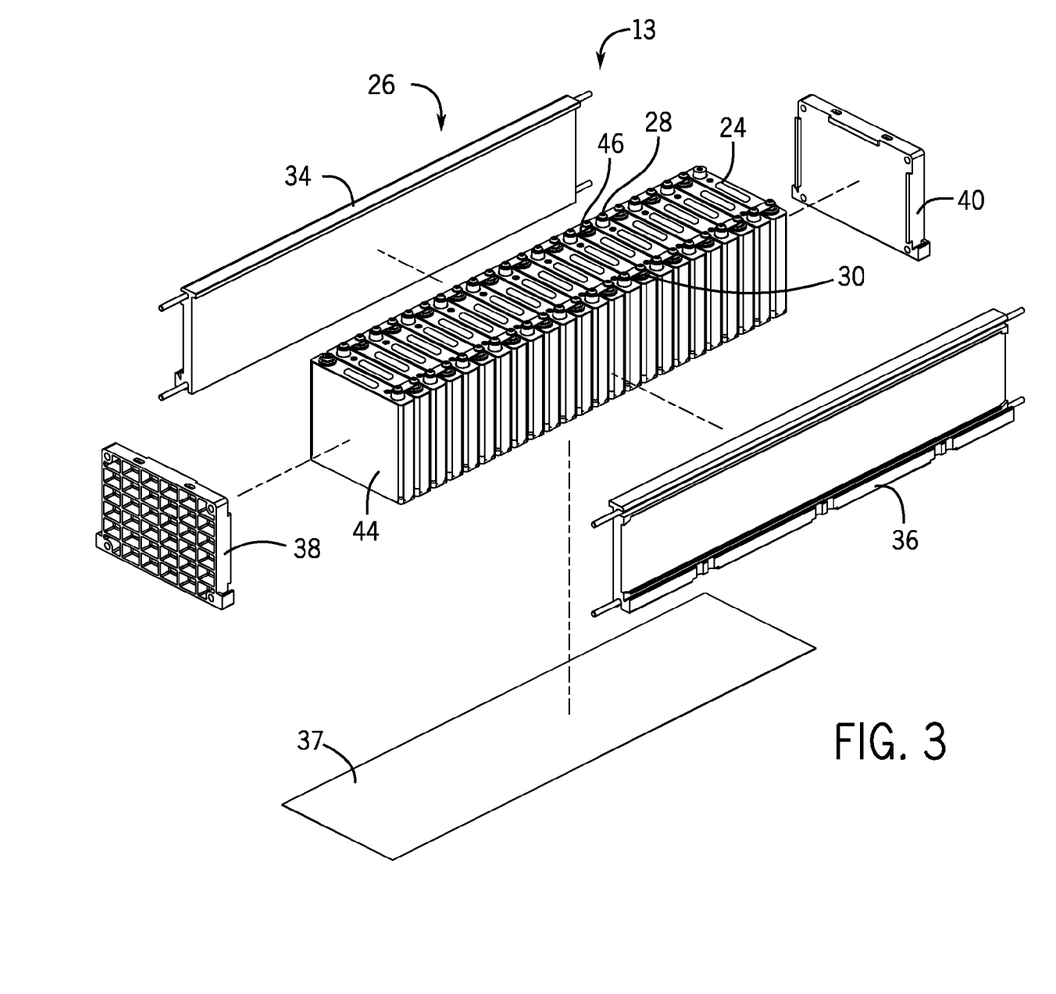
FIG. 3 is a partial exploded perspective view of an embodiment of the battery module for use in the vehicle of FIG. 1, in accordance with the present techniques.

One embodiment of a suitable battery module 13 is illustrated in an exploded perspective view in FIG. 3. As shown, the battery module 13 includes a plurality of Li-ion battery cells 24 that are contained within a battery module shell 26. According to an embodiment, the cells include at least one terminal, such as a positive terminal 28 and/or a negative terminal 30.

The Li-ion battery cells 24 in the illustrated embodiment are provided side-by-side one another such that a face of the first Li-ion battery cell 24 is adjacent a face of the Li-ion second battery cell 24 (e.g., the cells face one another). According to the illustrated embodiment, the Li-ion cells 24 are stacked in an alternating fashion such that the positive terminal 28 of the first cell is provided adjacent the negative terminal 30 of the second cell. Likewise, the negative terminal 30 of the first cell 24 is provided adjacent a positive terminal 28 of the second cell 24. Such an arrangement allows for efficient connection of the Li-ion battery cells 24 in series via bus bars. However, the Li-ion battery cells 24 may be otherwise arranged and/or connected (e.g., in parallel, or in a combination of series and parallel) in other embodiments.

In the illustrated embodiment, the battery module shell 26 for the battery module 13 includes a first side bracket 34 and a second side bracket 36. The shell 26 further includes a first end cap 38 and a second end cap 40. As shown, the end caps 38 and 40 are secured to the side brackets 34 and 36, respectively. The Li-ion battery cells 24 may be generally prismatic lithium-ion cells, as shown in the illustrated embodiment. According to other embodiments, the Li-ion battery cells 24 may have other physical configurations (e.g., oval, cylindrical, polygonal, etc.). Additionally, in some embodiments, the capacity, size, design, and other features of the Li-ion battery cells 24 may differ from those shown.

Each Li-ion battery cell 24 includes a housing 44 (e.g., a can or container) through which the battery terminals 28 and 30 extend. Accordingly, it should be noted that each Li-ion battery cell 24 refers to a complete battery cell with a Li-ion battery cell element 45 contained within the housing 44. In certain embodiments of the present disclosure, each Li-ion battery cell element 45 may be contained within the battery module 13 without the housing 44. In such embodiments, elements of the battery module 13 (e.g., partitioning elements) may be utilized to electrically isolate portions of each Li-ion battery cell elements 45 from one another. Thus, "Li-ion battery cell 24" referred to forthwith relates to a complete battery cell including the housing 44, and "Li-ion battery cell element 45" or "cell element 45" refers to the jelly-roll shaped cell element 45 (e.g., wound or stacked electrodes) that may be placed within the housing 44 to form the complete Li-ion battery cell 24 (which may in turn be used in the battery module 13), or may be included directly in the battery module 13 without the housing 44.

In the illustrated embodiment, each Li-ion battery cell 24 includes a fill hole 46 through the housing 44 for introducing electrolyte into the battery cell 24, such that the battery cell element 45 of the battery cell 24 is immersed in electrolyte. In present embodiments, the housing 44 may be a polymeric (e.g., plastic) housing 44 formed via an injection molding process. In particular, the housing 44 may be an electrically non-conductive polymeric housing 44.

In some embodiments, the battery module 13 may include fewer or more Li-ion battery cell elements 45 than shown in FIG. 3. Additionally, in some embodiments, each battery cell element 45 may be placed directly into the battery module 13, without the housing 45 around each battery cell element 45. For example, in FIG. 4, a partially exploded perspective view of an embodiment of the battery module 13 is shown with two Li-ion battery cell elements 45. However, the features of the battery module 13 shown in FIG. 4 may apply to a battery module 13 having more than two Li-ion battery cell elements 45.

Figure 4:
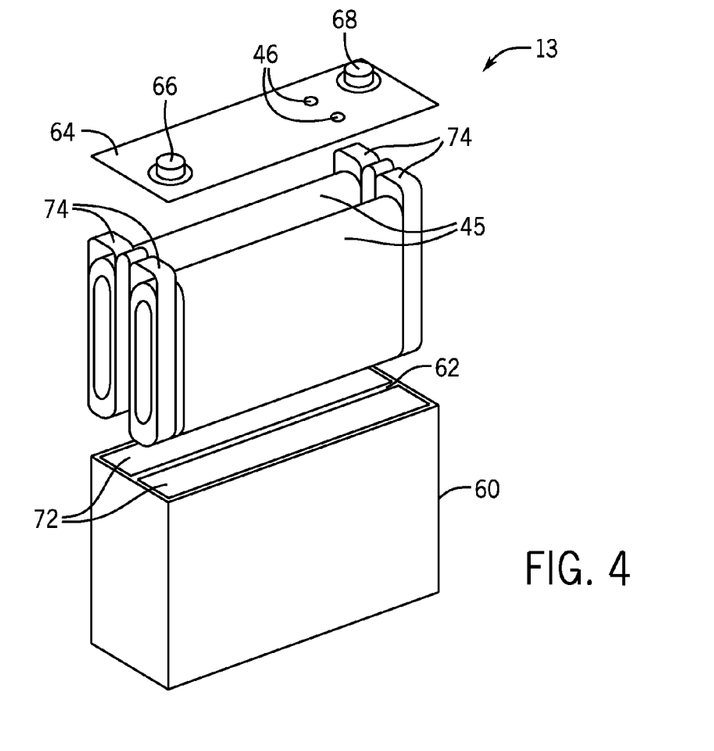
FIG. 4 is a partial exploded perspective view of another embodiment of the battery module for use in the vehicle of FIG. 1, in accordance with the present techniques.

In the illustrated embodiment, the battery module 13 includes a container 60 with two cell elements 45 separated by a partition 62. The battery module 13 also includes a lid 64 (or cover) with two terminals 66, 68. These terminals 66, 68 may be coupled to end terminals 28, 30 of the Li-ion battery cell elements 45 coupled together in series and/or in parallel within the container 60. The lid 64 also includes electrolyte fill holes 46, one over each Li-ion battery cell element 45, such that electrolyte may be introduced into the container 60 and each cell element 45 is immersed in electrolyte. Additionally, each cell element 45 in the illustrated embodiment is exposed within the container 60. In other words, the cell elements 45 do not include individual housings (e.g., housings 44 in FIG. 3). In this example, each cell element 45, as previously described, forms a jelly roll shape (e.g., wound or stacked electrodes), and each cell element 45 fits into an individual compartment 72 in the battery module 13, where the compartments 72 are separated by the partition 62. In certain embodiments, the container 60 of the battery module 13 may include multiple partitions 62, such that the container 60 includes three or more compartments 72 for three or more cell elements 45. Each partition 62 electrically isolates the cell elements 45, except for an electrical connection between the cell elements 45 via electrical connectors 74. For example, each cell element 45 may include electrical connectors 74 on either end. The electrical connectors 74 are configured to electrically couple the cell elements 45 in parallel or in series. The electrical connectors 74 may extend from the terminal 28 of one cell element 45 to the terminal 30 of another cell element 45 by extending over the partition 62 and under the lid 64, over the partition and through the lid 64 (e.g., partially embedded within the lid 64), or through an aperture in the partition 62. Additionally, each compartment 72 may contain electrolyte introduced into the container 60 through the electrolyte fill holes, as previously described. Once filled with electrolyte, sealed, and isolated, the two cell elements 45 form two Li-ion battery cells 24 in the module 13.

Figure 5:
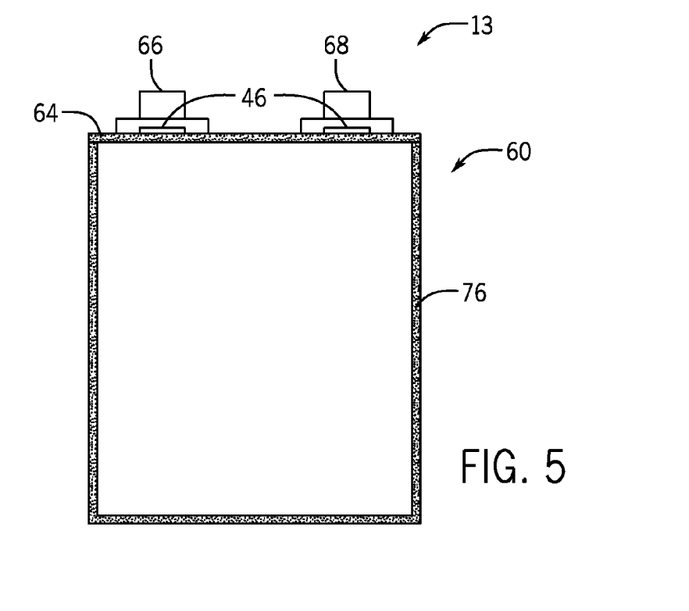
FIG. 5 is a cross-sectional view of an embodiment of a container for the battery module for use in the vehicle of FIG. 1, in accordance with the present techniques.

In some embodiments, the container 60 of the battery module 13 may not include the partition 62. In such embodiments, each individual cell element 45 may include the housing 44 to form the Li-ion battery cell 24, as previously described with reference to FIG. 3. Accordingly, the housing 44 is configured to electrically isolate the cell element 45 from other cell elements 45. In other words, in some embodiments, the partition 62 may be included to electrically isolate cell elements 45. In other embodiments, the container 60 may not include the partition 62, but each cell element 45 may include the housing 44 to electrically isolate each cell element 45 from one another. One such embodiment of the container 60 without the partition 62 is shown in FIG. 5, which is a cross-sectional view an embodiment of the battery module 13 including the container 60 configured to retain Li-ion battery cells 24. In the illustrated embodiment, the battery module 13 includes the container 60 and the cover 64, and the cover 64 includes the electrolyte fill holes 46 configured to align with electrolyte fill holes 46 of the cells 24. The electrolyte fill holes 46 may or may not be included in the container 60, as each Li-ion battery cell 24 may have electrolyte introduced into the cell 24 through fill holes 46 in the housing 44 before being placed in the container 60. Although the illustrated embodiment of the container 60 is configured to hold two Li-ion battery cells 24, other containers 60 in accordance with the present embodiment may include three or more Li-ion battery cells 24. It should be noted that features of the container 60 described below (with reference to FIGS. 5-7) may apply to the container 60 without the partition 62 (e.g., as shown in the illustrated embodiments) and to the container 60 with the partition 62.

In the illustrated embodiment, the container 60 with the cover 64 is formed by an electrically nonconductive polymeric (e.g., plastic) material. By using a moldable polymer (e.g., plastic) instead of a metal, the container 60 may be injection molded into its final shape and may serve to electrically isolate the Li-ion battery cells 24 held therein. In some embodiments, the polymer may be a moldable, heat sealable material that exhibits resistance to water migration, resistance to oxygen migration, resistance to hydrocarbon/organic carbonate migration, resistance to electrolyte migration, or two or more of these. For example, polypropylene or polyphenylene sulfide (PPS) may be used as a water and/or chemical permeability barrier. However, polypropylene, PPS, and other polymers (e.g., polyimide, polyamide, polyethylene (PET), etc.) may not be sufficiently effective in preventing oxygen and certain fluid migration over the life time of the Li-ion battery cell 24 housed within the container 60, and thus may be reinforced with supplemental additives configured to prevent such migration.

Accordingly, nanomaterials may be used to supplement polymer based containers 60 of the battery modules 13 in accordance with the present disclosure. For example, materials such as silicate nanocomposites (e.g., exfoliated montmorillonite clay), nanocellulosic fibers, or individual or mixed nanometallic oxides may be blended with the polymer to form a composite 76, where the composite 76 is injection molded to form the container 60. In some embodiments, the nanomaterial(s) may be coated onto the polymer and co-extruded in dual or multiple layers. For example, the nanomaterial may be layered (e.g., by spraying the nanomaterial) over a polymer sheet or between two polymer sheets to form a multi-layer sheet, where the multi-layer sheet is injection molded and/or formed into the shape of the container 60. In some embodiments, the nanomaterial (e.g., nanosupplements) may be applied as films or coatings over a pre-formed polymer container 60. For example, the container 60 may be formed first, and the nanomaterial may be sprayed onto the container 60 after the container 60 is formed.

In any of the above described embodiments utilizing a polymer base with nanomaterial additives, the container 60 may be cheaper and more easily manufactured than it would be using traditional metal can configurations. For example, as described above, the polymer material is cheaper than most metals, and enables the container 60 to be injection molded into its final shape for a more efficient production method. Additionally, the container 60 may be injection molded around or integrally with other elements, such as a metal heat sink plate for thermal management, which will be described in detail with reference to later figures. Further, by utilizing nanomaterials in conjunction with the polymer base to form a nanocomposite, the container 60 may exhibit enhanced impermeability properties relative to polypropylene, PPS, or other polymers alone.

The composite 76 material may also be formed by a polymer base with additives used for enhanced thermal management. In accordance with the present disclosure, certain components of the Li-ion cells 24 operate best at temperatures between approximately 0 and 50° C. However, in some embodiments, the Li-ion cells 24 may and their associated battery module 13 may reach temperatures of up to approximately 85° C. Accordingly, additives blended with the polymer base may enable increased thermal management of the Li-ion cells 24 and battery module 13. More specifically, the additives may be materials that have higher thermal conductivities than the base polymer alone. Thus, when added to the base polymer, the additive(s) may increase the overall thermal conductivity of the container 60. As a result, the composite container 60 may more easily transfer heat away from heat-sensitive components of the battery module 13 and toward a heat sink or other cooling system of the battery module 13.

The composite 76 in the illustrated embodiment may include thermally conductive additives such as alumina (e.g., aluminum oxide), aluminum, brass, graphite, magnesium oxide, stainless steel, calcium carbonate, acetylene black, and/or glass. The additives may include flakes, fibers, powder, and/or microspheres added to the polymer (e.g., plastic) base. Thermal conductivity values for certain additives are in Table 1 shown below:

TABLE 1

| Composite Material | Thermal Conductivity at Room Temperature |
|---|---|
| Unfilled plastic polymers | 0.17-0.35 W/mK |
| Polyimide + 40% graphite | 1.7 W/mK |
| Rubber + Aluminum Oxide ($Al_2O_3$) | 0.6 W/mK |
| Rubber + Aluminum flakes | 1.0 W/mK |

Additionally, certain commercially available products that include electrically non-conducting polymer plastics may also offer desirable thermal conductivity. For example, certain COOLPOLY® D-series dielectric plastics generally include additives to enhance thermal conductivity and may offer up to 10 W/mk thermal conductivity. In other words, certain COOLPOLY® D-series dielectric plastics may be polymer blends or composites and may be used alone or may include additional additives described above. Additionally, COOLPOLY® D-series dielectric plastics (e.g., polymer blends or composites) may offer up to 10 W/mk or approximately 5-100 times the thermal conductivity of an unfilled plastic polymer. These dielectric plastics, other composite materials shown in Table 1, or other thermally conductive and electrically isolative polymers may be used to enhance the thermal conductivity of the housing 44 or the battery module 13 with the container 60.

In some embodiments, the container 60 may be formed using a moldable polymer material, as previously described, but in conjunction with a metallized coating on an inside of the battery module 13 for enhanced thermal management and/or permeability management. The metalized coating may include a pure metal, a metal alloy, a metal oxide, or a metal nitride. For example, the metalized coating may be an aluminized layer. In particular, the aluminized layer may be pure aluminum, an aluminum alloy, aluminum oxide, or aluminum nitride. Other metals (e.g. in the form of pure metals, metal alloys, metal oxides, or metal nitrides) that may be used include copper, steel, and nickel.

Figure 6:
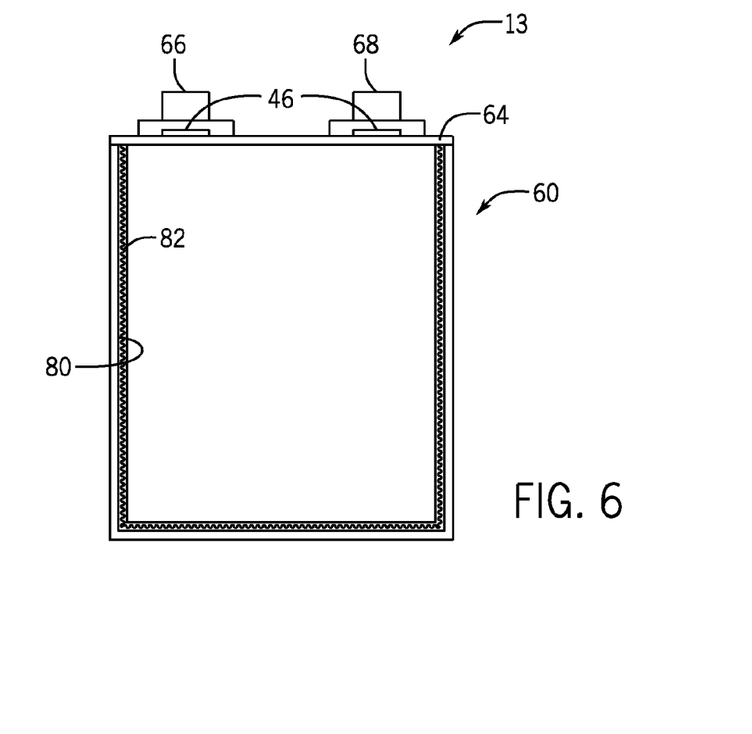
FIG. 6 is a cross-sectional view of another embodiment of a container for the battery module for use in the vehicle of FIG. 1, in accordance with the present techniques.

For example, FIG. 6 is a cross-sectional view of an embodiment of the battery module 13 having the container 60, where the container 60 is made with a polymeric material, such as polypropylene, PPS, or some other plastic. In the illustrated embodiment, the container 60 is coated on an inner wall 80 of the container 60 with an aluminized layer 82. The aluminized layer 82 may be added by sputtering a thin film onto the inner wall 80 of the container 60. The container 60 with the aluminized layer 82 may exhibit both enhanced thermal management properties and enhanced permeability properties. In other words, the aluminized layer 82 in the illustrated embodiment serves to extract heat from cell element 45 as well as block gasses and liquid from egress out of or ingress into the container 60. The aluminized layer 82 may extract heat from each cell element 45, and the heat may be spread evenly throughout the container 60 of the battery module 13. Thus, particular areas of the container 60 (e.g., particular cell elements 45 in the container 60) may not experience heat differentials relative to other areas of the container (e.g., other cell elements 45 in the container). Additionally, the aluminized layer 82 may block the electrolyte inside the container 60 from permeating the container 60. Additionally, it should be noted that some other metal (e.g., pure metal, metal alloy, metal oxide, or metal nitride) capable of being added by sputtering a thin film or coating a thin film or layer on an inside of the container 60 may also be used for permeability and/or thermal management, as described above.

Figure 7:
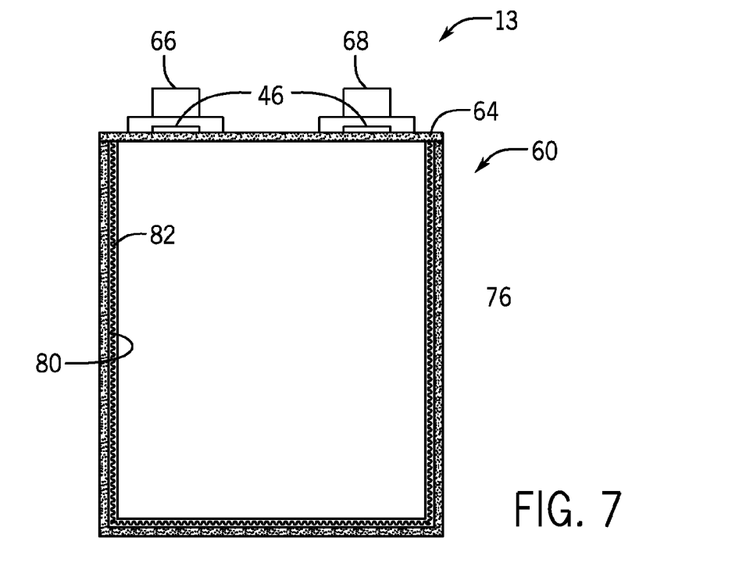
FIG. 7 is a cross-sectional view of another embodiment of a container for the battery module for use in the vehicle of FIG. 1, in accordance with the present techniques.

In some embodiments, techniques and features from the embodiments in FIGS. 5 and 6 may be used in combination. For example, in FIG. 7, an embodiment of the battery module 13 in accordance with the present disclosure is shown in a cross-sectional illustration. In the illustrated embodiment, the container 60 is formed with a composite 76 including a polymer base (e.g., polypropylene, PPS, or polyimide). The composite 76 may also include a nanomaterial to address permeability concerns (e.g., to combat ingress and egress of gases and/or liquids), as described with reference to FIG. 5, an additive for generating a thermally enhanced polymer, as described with reference to FIG. 5, or a combination of both. The container 60 may include an aluminum (or some other metal) layer 82 that may be coated on the inside surface 80 of the container 60, as described with reference to FIG. 6. In some embodiments, the composite 76 may make the container impermeable to undesired liquids and gases, while the aluminum layer 82 may enhance thermal management and/or provide additional permeability control. In other embodiments, the composite 76 may enhance thermal management and the aluminum layer 82 may make the container impermeable to undesired liquids and gases. Accordingly, the resulting battery module 13 may include a moldable base polymer material that exhibits enhanced thermal management and enhanced permeability management at a reduced cost and with more flexible production methods (e.g., injection molding) than configurations that utilize an expensive metal material for the container 60.

In accordance with the present disclosure, similar techniques and materials as those described above (with reference to the battery modules 13) may be utilized to enhance thermal management and permeability management for each individual Li-ion battery cell 24. As discussed above, the container 60 of the battery module 13 may include cost-effective features that enable enhanced thermal management and permeability management of a polymer based battery system 12. In addition to, or in lieu of these features, the Li-ion battery cells 24 may include cost-effective features that enable enhanced thermal management and permeability management of the polymer (e.g., plastic) based battery system 12 as well. For example, an embodiment of an individual, prismatic Li-ion battery cell 24 is shown in a cutaway perspective view in FIG. 8. In the illustrated embodiment, the individual Li-ion battery cell 24 includes a jelly roll shaped Li-ion electrochemical element 45 enclosed by a polymer (e.g., plastic) based housing 44. The polymer based housing 44 may be used instead of metal because it is cheaper and electrically insulates the Li-ion battery cell 24 from a surrounding environment 90. The polymer alone, however, may not exhibit sufficient thermal management and/or permeability management properties. Accordingly, nanomaterials, additives, and other techniques and/or features described above may be applied to the housing 44 of the Li-ion battery cell 24.

Figure 8:
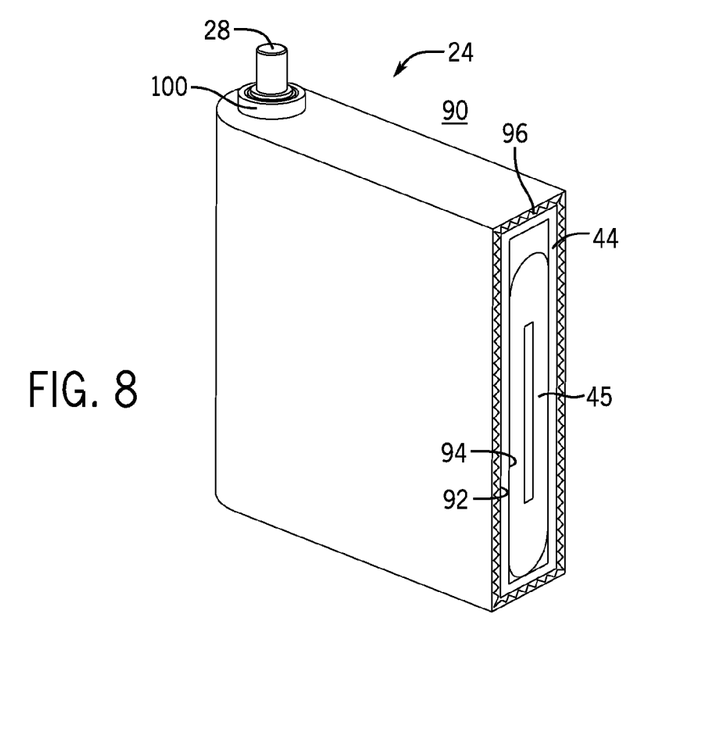
FIG. 8 is a cutaway perspective view of an embodiment of a prismatic electrochemical cell, in accordance with the present techniques.

Additionally, the polymer based housing 44 of the Li-ion battery cell 24 (e.g., enclosing the cell element 45) may be metalized on an external surface 92 of the housing 44, as shown in the illustrated embodiment. In another embodiment, the polymer based housing 44 of the Li-ion battery cell 24 may be metalized on an internal surface 94 of the housing 44. In either configuration, the metallization enables a metalized layer 96 to control permeability of the individual Li-ion battery cell 24. For example, the metalized layer 96 on the external surface 92 of the housing 44 may block ingress of moisture, gases, and/or other fluids or liquids through the polymer based housing 44 into the Li-ion battery cell 24. The metalized layer 96 on the internal surface 94 of the housing 44 may block egress of electrolyte through the polymer based housing 44 to the surrounding environment 90. In both configurations, the polymeric material of the housing 44 is protected from fluids saturating and/or negatively affecting the housing 44, and fluids are isolated from entering or exiting from inside the Li-ion battery cell 24. Additionally, in some embodiments, the housing may include the metalized layer 96 on the internal surface 94 of the housing 44 and the metalized layer 96 on the external surface 92 of the housing 44 to block both egress of electrolyte and ingress of moisture, gases, and/or other fluids.

The Li-ion battery cell 24 may include one or more terminals 28 extending through an opening in the housing 44 and the metalized layer 96. A plastic seal ring 100 may be disposed around each terminal 28. The plastic seal ring 100 may extend from the housing 44 and through the metalized layer 96, such that the plastic seal ring 100 electrically isolates the terminal 28 from the metalized layer 96. The plastic seal ring 100 may also serve to seal the opening in the housing 44 through which the terminal 28 extends. The plastic seal ring 100 may be thermally shrink fit or crimped around the terminal 28, welded to the terminal 28 via laser or ultrasonic welding, or coupled to the terminal 28 in some other manner.

Figure 9:
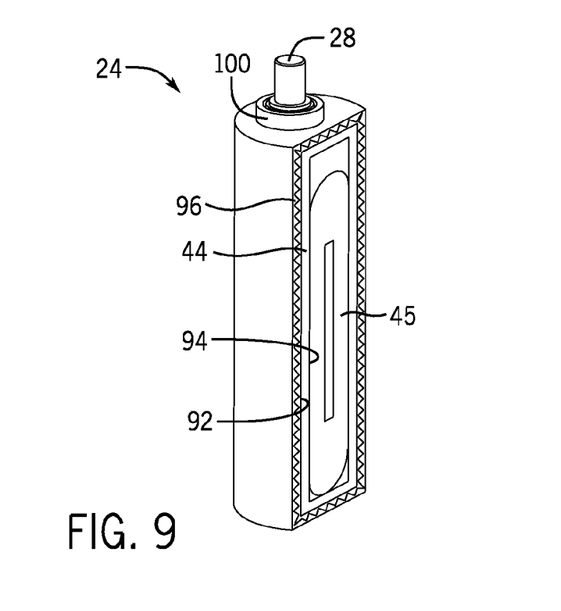
FIG. 9 is a cutaway perspective view of an embodiment of a cylindrical electrochemical cell, in accordance with the present techniques.

The above described techniques may also apply to a Li-ion battery cell 24 that is not prismatic. For example, an embodiment of a cylindrical Li-ion battery cell 24 is shown in a cutaway perspective view in FIG. 9. In the illustrated embodiment, the metalized layer 96 is disposed on the external surface 92 of the housing 44, but may be disposed on the internal surface 94 of the housing 44 in other embodiments. As previously described, the housing 44 may include a polymer (e.g., plastic) base with nanomaterial supplements and/or other thermally enhancing additives. The metallization surface 96 may serve as a permeability barrier and/or thermal management surface. As previously described, the metalized layer 96 may be applied to both the external surface 92 and the internal surface 94 of the housing 44.

In order to enable a full permeability barrier for each individual Li-ion battery cell 24 and/or the container 60 of the battery module 13 holding the cells 24, welding techniques may be used to seal elements of the housing 44 of the Li-ion battery cell 24 or the container 60. For example, an embodiment of the individual Li-ion battery cell 24 with the prismatic shape is shown in a cross-sectional view in FIG. 10. In the illustrated embodiment, the housing 44 of the Li-ion battery cell 24 may be enhanced by nanomaterials or other additives, as described above. Additionally, the housing 44 may have the metalized surface 96.

Figure 10:
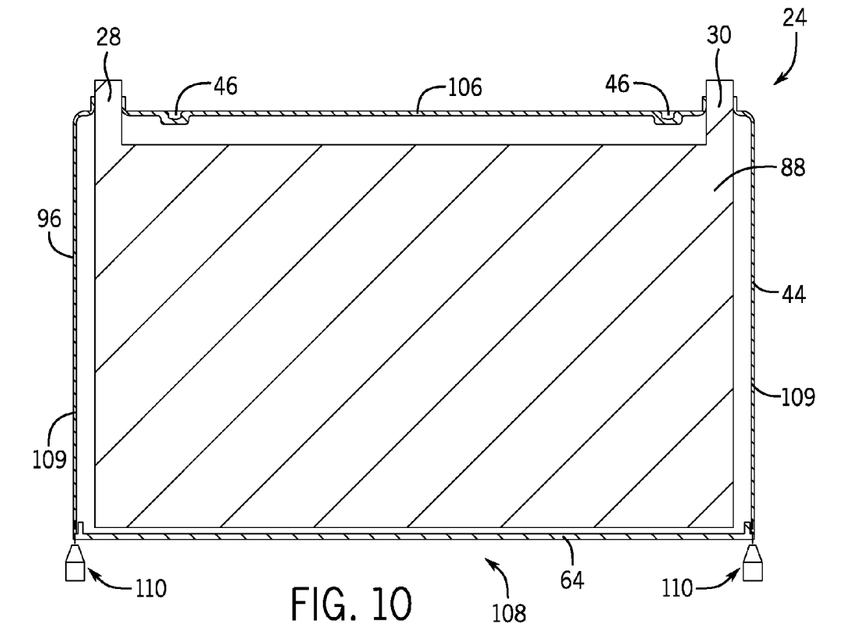
FIG. 10 is a cross-sectional view of an embodiment of a housing for use in the prismatic electrochemical cell of FIG. 8, in accordance with the present techniques.

The Li-ion battery cell 24 includes the cover 64 disposed in an opening of the housing 44 opposite a top 106 of the housing 44. In other words, the cover 64 may form a bottom 108 of the housing 44. Additionally, an outer wall 109 (e.g., a side wall) may extend from the top 106 to the bottom 108 of the housing 44, and the outer wall 109 may form a prismatic body of the Li-ion battery cell 24. The outer wall 109 may extend in an ovular or curved manner around the cell element 45, between the top 106 and the bottom 108 (e.g., the cover 64) of the housing 44.

In the illustrated embodiment, the cover 64 is made from a transmissive material (e.g., relative to heat and/or light) and the outer wall 109 of the housing 44 is made of an absorptive material (e.g., relative to heat and/or light). The transmissive material generally refers to a material configured to allow light and/or heat from a heat source to pass through it, while the absorptive material generally refers to a material configured to absorb heat from the heat source. For example, the transmissive material may be substantially an unfilled grade of PPS, while the absorptive material may PPS based with glass and carbon additives.

In the illustrated embodiment, components formed by the absorptive material are configured to absorb heat and melt into the transmissive material. For example, a laser welding tool 110 may transmit light and/or heat via a laser through the transmissive material of the cover 64 to the absorptive material of the outer wall 109. The outer wall 109 absorbs heat from the laser welding tool 100 and melts into the cover 64, thereby welding the cover 64 to the housing 44. It should be noted that, given the same position of the laser welding tool 110 shown in the illustrated embodiment, the cover 64 may be made of the absorptive material and the outer wall 109 may be made of the transmissive material. In other words, the laser welding tool 110 may apply heat directly to the cover 64, such that the cover 64 absorbs heat from the laser welding tool 110 and melts into the outer wall 109. Upon melting into the outer wall 109, the cover 64 seals the bottom 108 of the housing to block ingress of moisture into the housing 44 and block egress of electrolyte out of the housing 44.

In another embodiment, the laser welding tool 110 may be positioned adjacent to the outer wall 109. For example, an embodiment of the Li-ion battery cell 24 in accordance with the present disclosure is illustrated in a cross-sectional view in FIG. 11. In this embodiment, the outer wall 109 may be made from a transmissive material while the cover 64 is made from an absorptive material. In the illustrated embodiment, the laser welding tool 110 is positioned such that the laser is directed through the outer wall 109. A lip 120 that extends around a perimeter of the cover 64 is configured to fit inside the outer wall 109 of the housing 44. Thus, in the illustrated embodiment, the laser welding tool directs the heat from the laser through the transmissive material of the outer wall 109 to the lip 120 of the cover 64, melting the lip 120 into the outer wall 109. As previously described, in another embodiment, the outer wall 109 may be the absorptive material and the cover 64 may be the transmissive material. Accordingly, the outer wall 109 may absorb heat from the laser welding tool 110 and melt directly into the lip 120 of the cover 64.

Figure 11:
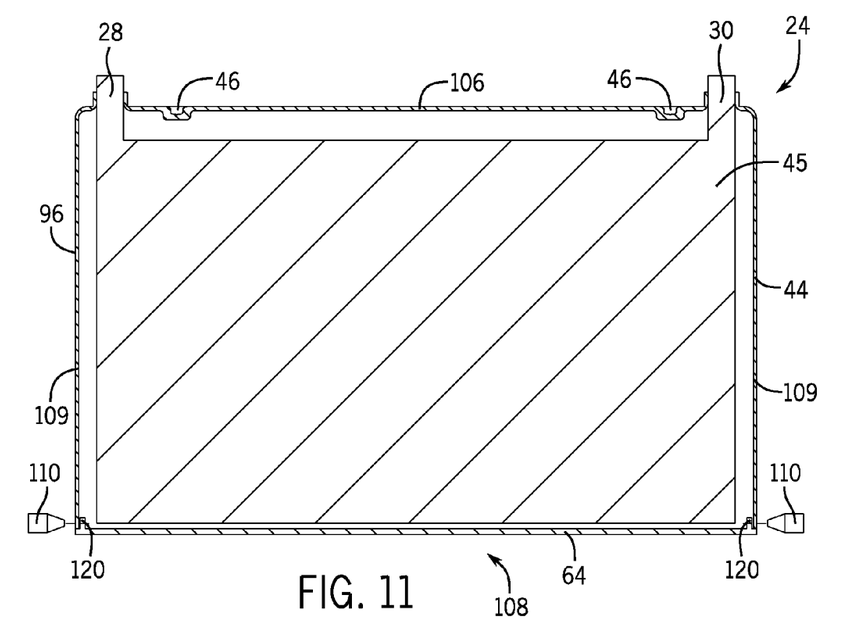
FIG. 11 is a cross-sectional view of another embodiment of a housing for use in the prismatic electrochemical cell of FIG. 8, in accordance with the present techniques.

In the embodiments discussed with reference to FIGS. 10 and 11, the transmissive and absorptive materials may include a polymer (e.g., plastic) base, as previously described. Additionally, the absorptive material may include glass and carbon additives. For example, the absorptive material may include approximately 20% glass and approximately 0.5% carbon additive. The transmissive material may be substantially an unfilled grade of PPS. Thus, it may be desirable to include a transmissive material for the cover 64, such that fillers and/or additives may be added to the housing 44 (which generally includes a greater volume than the cover 64) for enhanced thermal management and permeability management, as previously described. However, in another embodiment, both the housing 44 and the cover 64 may include additives for enhanced thermal management and permeability management. In such embodiments, a portion of the cover 64 or housing 44 that serves as a welding surface may not include additives. For example, the cover 64 may be graded such that the lip 120 does not include additives while all other portions of the cover 64 do include additives. As such, the lip 120 may be an unfilled grade of PPS or some other polymer, such that the lip 120 includes the transmissive material, as described above. Thus, the housing 44 and the cover 64 together offer thermal and/or permeability management around the entirety of the cell 24.

It should be noted that, due to sensitivity of electrolyte used in the Li-ion battery cells 24, materials for material selection for the cover 64 and the housing 44 may be limited compared to materials for material selection for elements in other battery systems. Indeed, material selection for any of the above described features and/or techniques regarding the battery module 13 forming the container 60 and the individual Li-ion battery cells 24 is constrained by the electrolyte composition used in lithium ion applications. Accordingly, the material selection described above may enable the laser welding techniques described above, and the materials and techniques of the present disclosure may be tailored for use in Li-ion battery cell 24 and Li-ion battery system applications.

Figure 12:
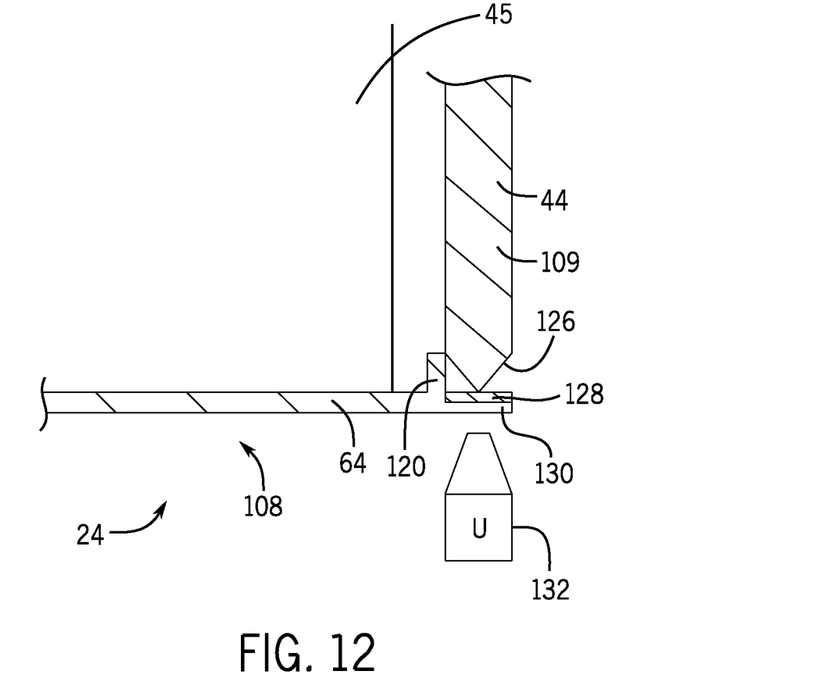
FIG. 12 is a partial cross-sectional view of a portion of an embodiment of a housing being welded for use in the prismatic electrochemical cell of FIG. 8, in accordance with the present techniques.

Ultrasonic welding techniques may also be used for sealing the cover 64 to the outer wall 109 of the housing 44. For example, a portion of an embodiment of the Li-ion battery cell 24 (e.g., the housing 44) being sealed via ultrasonic welding is shown in FIG. 12. In the illustrated embodiment, the outer wall 109 includes a ridge 126 that contacts the cover 64. The ridge 126 may extend with the outer wall 109 around the Li-ion battery cell 24. The ridge 126 may be disposed over small ridges 128 of the cover 64. The small ridges 128 of the cover may extend between the lip 120 of the cover 64 and an outermost perimeter 130 of the cover 64. The small ridges 128 of the cover 64 may be disposed such that they are oriented substantially perpendicular to the ridge 126 of the outer wall 109.

In the illustrated embodiment, the small ridges 128 and the ridge 126 may be energy directors for an ultrasonic welding tool 132. In some embodiments, the ultrasonic welding tool 132 may be a torsional ultrasonic welding tool 132. In the present embodiment, the ultrasonic welding tool 132 may be positioned adjacent to and/or in contact with the cover 64. The ultrasonic welding tool 132 may emit high-frequency ultrasonic acoustic vibrations that are locally applied while the cover 64 and the outer wall 109 of the housing 44 are pressed together. The vibrations may cause a solid-state weld to form between the outer wall 109 and the cover 64. The energy directors (e.g., the small ridges 128 of the cover 64 and the ridge 126 of the outer wall 109) may focus energy at the edges of the small ridges 128 and the ridge 126 to urge the outer wall 109 and the cover 64 to join together, where the edges may form a 60-90° angle. The ridges may melt down such that the cover 64 and the outer wall 109 are joined and sealed without major crevices or irregular protrusions. It should be noted that, in some embodiments, the cover 64 might not include the small ridges 128, but rather a smooth surface. The materials of the outer wall 109 and the cover 64 may be the same as those used in the laser welding techniques described above, or the materials may be different. For example, the materials may include additives and/or nanomaterials as previously described with reference to previous embodiments. Additionally, in some embodiments, the ridge 126 may be disposed on the cover 64 and the small ridges 128 may be disposed on the outer wall 109.

It should be noted that the welding techniques discussed above (e.g., laser welding and ultrasonic welding) may apply to welding of the cover 64 to the container 60 of the battery module 13. In other words, the welding techniques may apply to sealing the individual Li-ion electrochemical cells 24, the welding techniques may apply to sealing the container 60, or the welding techniques may apply to sealing the individual electrochemical cells 24 and the container 60. The welding techniques may generate a weld configured to block moisture from ingressing into the battery module 13 and/or configured to block electrolyte from egressing out of the battery module 13.

Figure 13:
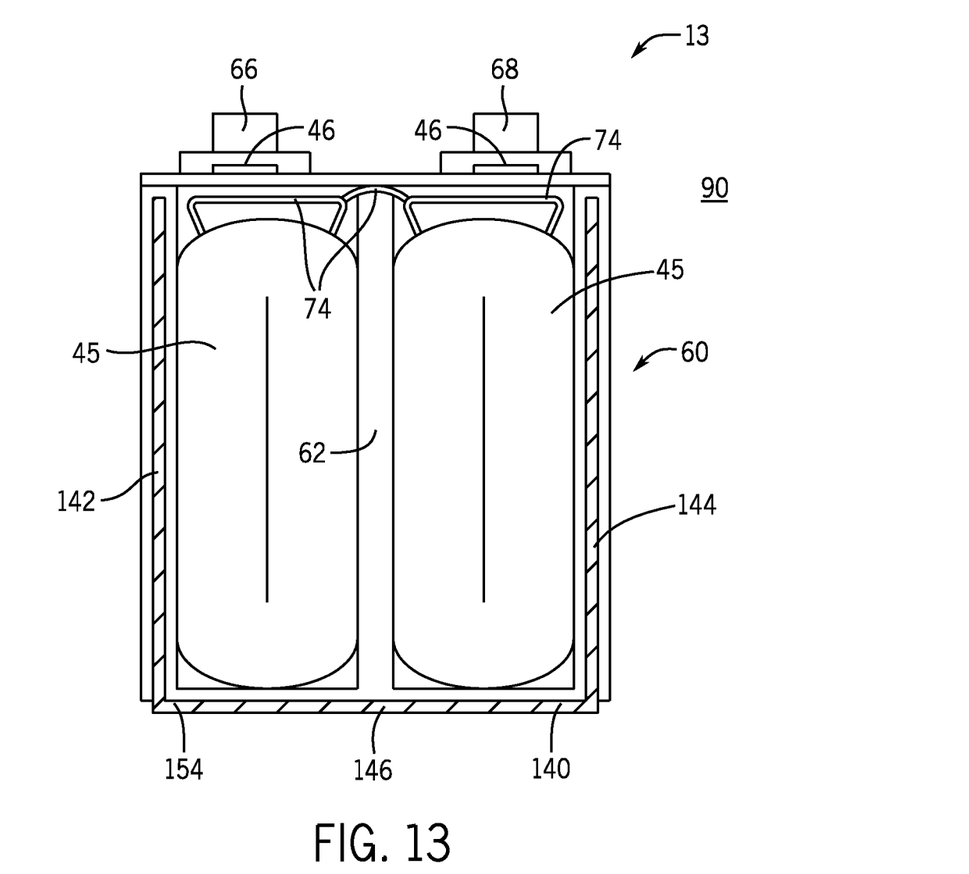
FIG. 13 is a cross-sectional view of an embodiment of the battery module for use in the vehicle of FIG. 1, in accordance with the present techniques.

In accordance with the present disclosure, the above referenced techniques, features, and/or materials may be utilized for the Li-ion battery cell 24, the battery module 13 with the container 60, or both. In additional to the above referenced techniques and materials, a heat sink may be included in the container 60 of the battery module 13 and/or housing 44 of the Li-ion battery cell 24 (e.g., the housing 44 around the cell element 45). For example, FIG. 13 is a cross-sectional view of an embodiment of the battery module 13 having a U-shaped heat sink 140 molded into the container 60 of the battery module 13. The U-shaped heat sink 140 may have a U-shaped cross-sectional profile including a first leg 142, a second leg 144, and a connecting base member 146. The first leg 142 and the second leg 144 may extend into portions of the container 60 of the battery module 13 or housing 44 of the Li-ion battery cell 24, depending on the embodiment, and the connecting base member 146 may be exposed to atmosphere (e.g., the environment 90). The container 60 or housing 44, or a combination of both, includes a polymer (e.g., plastic) base material, as previously described, and may have any of the additives and/or nanosupplements described above. The container 60 may have the partition 62 configured to electrically isolate the cell elements 45. The cell elements 45 may, however, be electrically connected in series or parallel via the electrical connectors 74, as previously described.

The container 60 in the illustrated embodiment may have the U-shaped heat sink 140 molded into the walls of the container 60, which may be enabled by the previously described material selection of the container 60. The molded in U-shaped heat sink 140 may be configured to extract heat from the cell elements 45 and/or the container 60 holding the cell elements 45 and the container 60. The U-shaped heat sink 140 in the illustrated embodiment spans two cell elements 45. In another embodiment, the U-shaped heat sink 140 may span one cell element 45, three cell elements 45, or more than three cell elements 45, depending on a desired thermal management of the battery module 13. Further, multiple U-shaped heat sinks 140 may be used in a single battery module 13, and the U-shaped heat sinks 140 may be integrally formed together such that one leg of a first U-shaped heat sink 140 makes up one leg of a second U-shaped heat sink 140.

It should be noted that the U-shaped heat sink 140 may be disposed within and retained by the housing 44 of each individual Li-ion battery cell 24 (e.g., the housing 44 around each cell element 45). For example, the U-shaped heat sink 140 may extend into an outer portion of the housing 44, e.g., side walls of the housing 44. Additionally, any of the above referenced techniques for permeability management and/or thermal management, in accordance with the present disclosure, may be used in conjunction with the U-shaped heat sink 140, whether the U-shaped heat sink 140 is retained by the housing 44 of the Li-ion battery cell 24 or the container 60 of the battery module 13.

Figure 14:
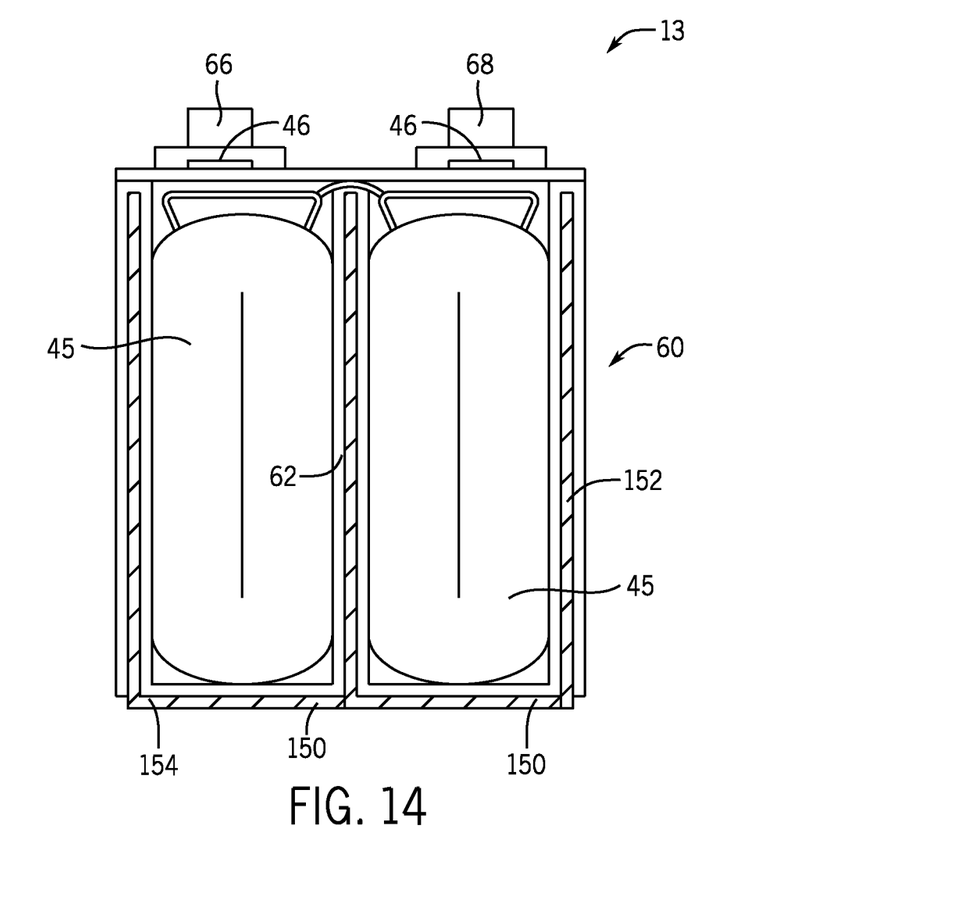
FIG. 14 is a cross-sectional view of another embodiment of the battery module for use in the vehicle of FIG. 1, in accordance with the present techniques.

Additionally, the heat sink may not be U-shaped. For example, FIG. 14 is a cross-sectional view of an embodiment of the battery module 13 having the container 60 with L-shaped heat sinks 150. In the illustrated embodiment, each L-shaped heat sink 150 spans one cell element 45. In another embodiment, each L-shaped heat sink 150 may span two or more cell elements 45. Additionally, a vertical heat sink element 152 may be disposed at an end of the battery module 13 forming the container 60 such that each cell element 45 has an equal surface area adjacent to the heat sinks. In other words, the vertical heat sink element 152 ensures that the outermost cell element 45 has a heat sink element adjacent to its outermost surface. However, in another embodiment, the battery module 13 may include L-shaped heat sinks 150 across each of the cell elements 45 except for the cell element 45 farthest to the right (e.g., from the perspective of the illustrated embodiment). The furthest cell element 45 to the right may include a U-shaped heat sink 140, as previously described, such that it has equal heat sink coverage as the other cell element(s) 45, without needing the vertical heat sink element 152 as previously described.

It should be noted that the U-shaped heat sinks 140 and the L-shaped heat sinks 152 may be descriptive of the cross-sectional views in FIGS. 13 and 14, but that the U-shaped heat sinks 140 and the L-shaped heat sinks 152 may actually extend around the container 60 of the battery module 13 and/or the housing 44 of the Li-ion battery cell 24. In other words, the U-shaped heat sinks 140 together and the L-shaped heat sinks 152 together may extend into and out of the presently illustrated cross-sectional views to form an open prismatic container (e.g., open at a top of the heat sinks) that is molded into the container 60. Thus, a greater surface area of the Li-ion battery cells 24 is adjacent to the heat sinks 140, 150 for greater heat extraction. Further, a bottom 154 of the U-shaped heat sink 140 (e.g., the connecting base member 146) and/or the L-shaped heat sink 150 in each respective embodiment may be exposed to the environment 90 such that an active cooling agent may pass over the bottom 154 for active cooling. For example, a fan may blow air or a pump may pump cooling fluid over the bottom 154 for enhanced heat extraction.

By using polymeric (e.g., plastic) materials for the Li-ion battery cells 24 and battery module 13 forming the container 60, production costs and part costs are reduced compared to configurations utilizing metal materials. Thermal management and permeability concerns may be addressed by including nanosupplements and additives, as well as metalized and/or aluminized surfaces, as described above. Additionally, polymeric materials may be over molded or injection molded with a heat sink for additional thermal management.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method for manufacturing a lithium ion (Li-ion) battery cell, comprising:
   disposing a Li-ion electrochemical cell element into a housing through an opening in a bottom of the housing opposite to terminal openings in a top of the housing, wherein the housing comprises a side wall coupled to and extending from the top of the housing to form the opening in the bottom of the housing, wherein the housing comprises an electrically nonconductive polymeric material;
   disposing a cover over the opening in the bottom of the housing such that a first ridge extending along the side wall of the housing contacts a plurality of second ridges oriented substantially perpendicular to the first ridge and disposed on the cover, wherein the cover comprises an electrically nonconductive polymeric material; and sealing the cover to the housing via a weld, wherein the weld is configured to resist or prevent ingress of moisture into the housing and to resist or prevent egress of electrolyte from the housing.

2. The method of claim 1, wherein sealing the cover to the housing via the weld comprises laser welding the cover to the housing, wherein the cover comprises a transmissive material configured to allow light from a laser to pass therethrough, and wherein the housing comprises an absorptive material configured to absorb the light transmitted through the transmissive material of the cover such that the cover melts into the housing to form the weld.

3. The method of claim 1, wherein sealing the cover to the housing via the weld comprises laser welding the cover to the housing, wherein the housing comprises a transmissive material configured to allow light and heat from a laser to pass therethrough, and wherein the cover comprises an absorptive material configured to absorb the light and heat transmitted through the transmissive material of the housing such that the housing melts into the cover to form the weld.

4. The method of claim 1, wherein sealing the cover to the housing via a weld comprises ultra-sonic welding.

\* \* \* \* \*